United States Patent [19]

Kitauchi et al.

[11] Patent Number: 4,969,423
[45] Date of Patent: Nov. 13, 1990

[54] CRANKSHAFT SUPPORT STRUCTURE

[75] Inventors: Fukumitsu Kitauchi; Masahiro Minowa, both of Osaka, Japan

[73] Assignee: Koyo Keiko Co., Ltd., Osaka, Japan

[21] Appl. No.: 343,824

[22] Filed: Apr. 27, 1989

[30] Foreign Application Priority Data

Apr. 28, 1988 [JP] Japan .............................. 63-57465[U]

[51] Int. Cl.⁵ ........................ F02B 75/02; F16C 35/00
[52] U.S. Cl. ................................. 123/65 R; 384/430; 384/479; 123/73 R
[58] Field of Search .............. 123/65 R, 73 R; 384/16, 384/147, 430, 477, 479, 480

[56] References Cited

U.S. PATENT DOCUMENTS

| | | | |
|---|---|---|---|
| 2,917,328 | 12/1959 | Peterson | 384/479 |
| 3,396,977 | 8/1968 | Iguchi | 384/477 |
| 3,414,275 | 12/1968 | Takahashi | 384/480 |
| 3,550,974 | 12/1970 | Kupchick | 384/480 |
| 4,320,724 | 3/1982 | Takada et al. | 123/73 AD |
| 4,557,612 | 12/1985 | Neal | 384/477 |
| 4,792,242 | 12/1988 | Colanzi et al. | 384/480 |
| 4,830,518 | 5/1989 | Shiratani et al. | 384/480 |
| 4,863,293 | 9/1989 | Sytsma | 384/489 |

FOREIGN PATENT DOCUMENTS

| | | |
|---|---|---|
| 1149951 | 6/1963 | Fed. Rep. of Germany ... 123/196 R |
| 2748595 | 5/1978 | Fed. Rep. of Germany ...... 384/480 |
| 1801894 | 11/1979 | Fed. Rep. of Germany ...... 384/480 |
| 0135967 | 6/1986 | Japan .............................. 384/430 |

*Primary Examiner*—David A. Okonsky

[57] ABSTRACT

A crankshaft support structure comprises a crankshaft, a crankcase for supporting the crankshaft, a lubricant-sealed bearing interposed between the crankshaft and the crankcase. This structure enables the amount of a lubricant in combustion gas to be reduced and the structure of an engine to be simplified by avoiding the provision of a oil passage for suppling the bearing with a lubricant.

6 Claims, 3 Drawing Sheets

CRANKSHAFT SUPPORT STRUCTURE

BACKGROUND OF THE INVENTION

The present invention relates to a crankshaft support structure in a two-stroke engine.

In the conventional two-stroke engine (as disclosed in Japanese Patent Examined Publication No. 56-53123 and Utility Model Unexamined Publication No. 58-112799 and so on), lubrication in a ball bearing for supporting a crankshaft is performed with a lubricant contained within a fuel. Therefore, the conventional fuel should contain a lubricant, thereby producing exhaust gas containing a lot of white smoke, which pollutes the air.

Further, an oil passage must be provided within a cylinder block, for guiding the lubricant contained in the mixed gas (fuel) toward the position of the ball bearing for supporting the crankshaft, which makes the structure disadvantageously complex.

SUMMARY OF THE INVENTION

In view of the foregoing, it is an object of the present invention to provide an improved crankshaft support structure for eliminating a conduit for supplying a lubricant oil to a bearing for supporting a crankshaft so as to simplify the structure of a two-stroke engine, so that the exhaust gas from the two-stroke engine is made clean as much as possible.

To achieve the above object, according to the present invention, a crankshaft support comprises a crankshaft for a two-stroke engine, a crankscase in which the crankshaft is supported, a pressure-resistant provided at both ends of outer and inner races, for sealing a lubricant, and a sealed bearing interposed between the crankshaft and the crankcase.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given thereinbelow and the accompanying drawings which are given by way of illustration only, and thus are not limitative of the present invention and wherein.

DESCRIPTION OF THE PREFERRED EMBODIMENT

Figure 1:
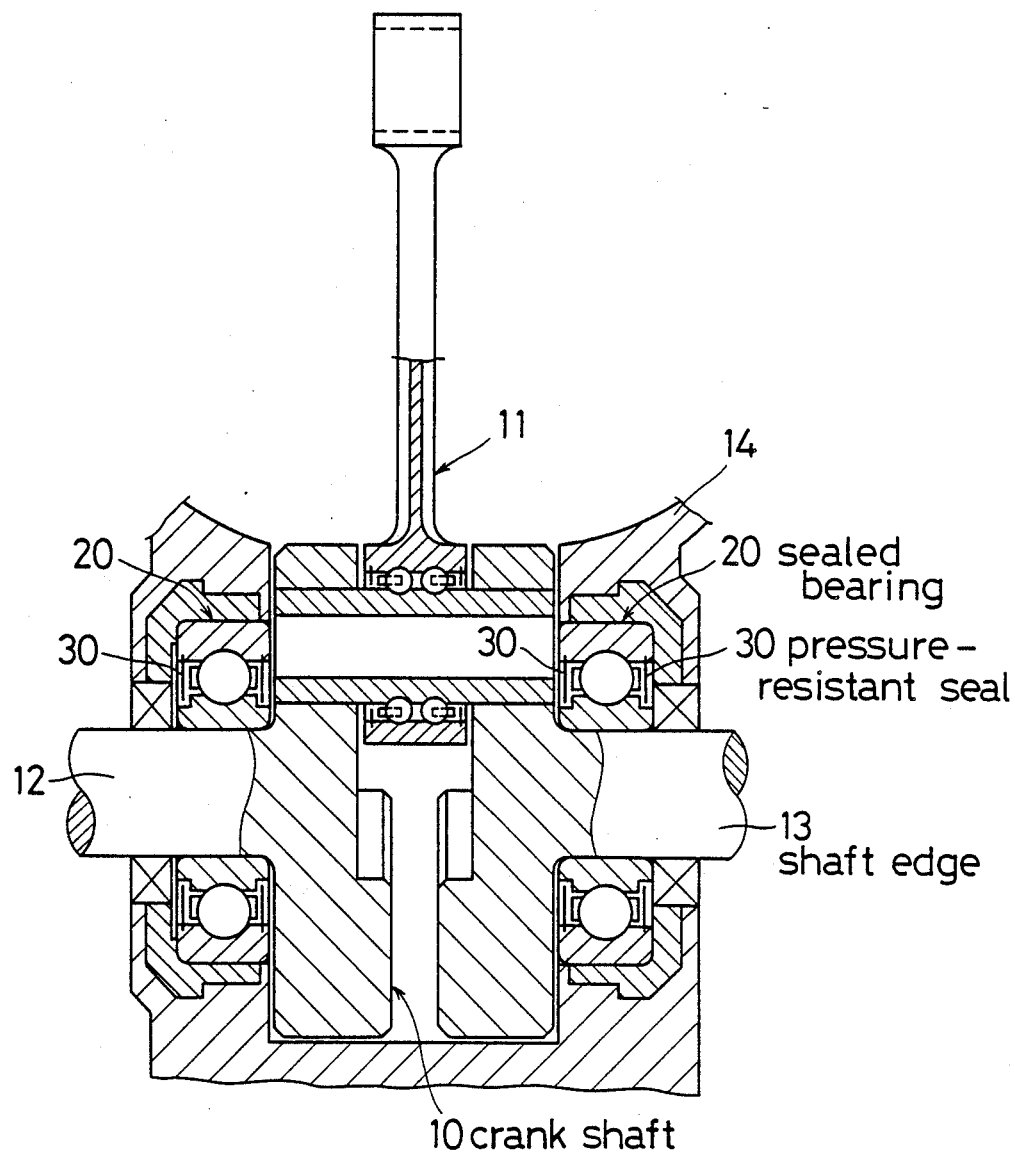
FIG. 1 is a cross-sectional view of a crankshaft support structure according to a preferred embodiment of the present invention.

FIG. 1 shows a crankshaft support structure according to a preferred embodiment of the present invention. A crankshaft 10 is attached to a connecting rod 11. Shaft edges 12 and 13 function as the center of rotation for the edges of the crankshaft 10. The shaft edges 12 and 13 are supported by a supporter 14 such as a crankcase via a sealed bearing 20.

As the above, the seal bearing 20 is used and a lubricant in it keeps the bearing lubricated. Therefore, no lubricant oil needs to be supplied to the sealed bearing 20, and the degree of the lubricant oil contained within the mixing gas can be reduced compared to the conventional case. Therefore the exhaustion gas after combustion does not include so much white smoke which pollutes the air. Further, a conduit for passing the lubricant oil to the sealed bearing 20 can be eliminated, which is conventionally provided in a cylinder block. The engine therefore be simplified.

Figure 2:
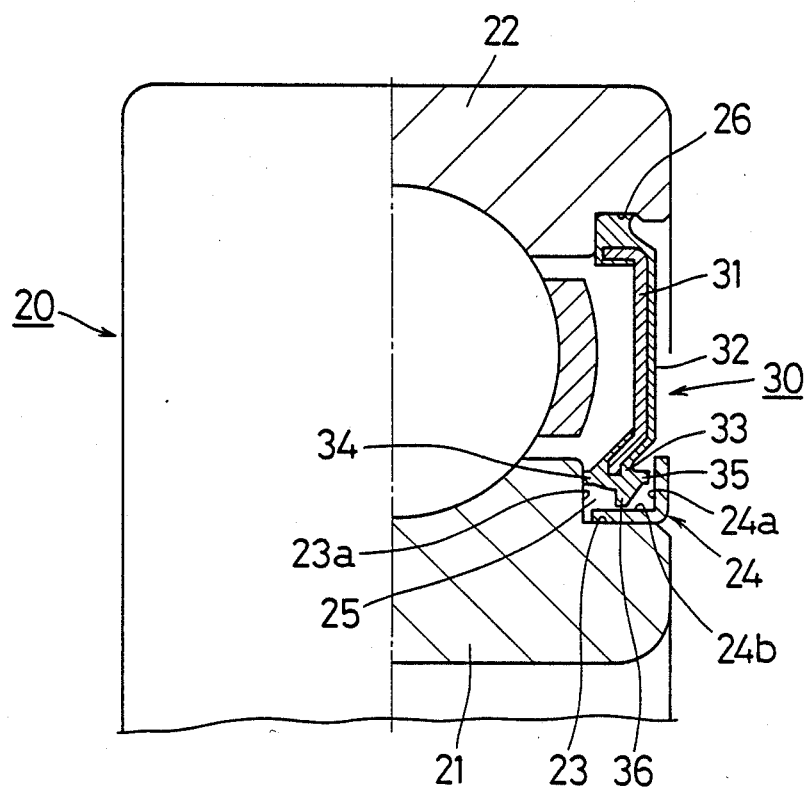
FIG. 2 is a cross-sectional view of a seal bearing used for the crankshaft support structures of FIG. 1.

FIG. 2 shows an example of the seal bearing 20. A sealed bearing 20 as shown in FIG. 2 is a normal deep groove ball bearing, where an inner race 21 and an outer race 22 have a pressure-resistant seal 30 on the shoulders of the bearing face of the races 21 and 22. The pressure-resistant seal 30 serves to close the gap between the inner and the outer races 21 and 22. A sectional view of the pressure-resistant seal 30 is illustrated in FIG. 2, but actually this is symmetrical.

A small circumferential step 23 is disposed on the shoulder of the bearing face of the inner race 21. An L-shaped ring 24 is pushed with pressure into the step 23 to form an annular concavity 25. Another step 26 is formed on the shoulder of the bearing face of the outer race 22.

The pressure-resistant seal 30 comprises a disk portion 32, consisting of a metal core 31 coated with an elastic material such as rubber, and a lip body 33 made of an elastic material such as rubber, formed at the inner circumference of the disk portion 32. The inner circumference of the metal core 31 is sunk within both the inside of the lip body 33 and the inside of the annular concavity 25 so as to strengthen the waist of the lip body 33. The outer circumference of the pressure-resistant seal 30 is disposed on a circumferential step 26 formed on the shoulder of the outer race 22. The lip body 33 is in front of the annular concavity 25 formed at the shoulder of the inner race 21. The lip body 33 is projected inwardly to the inner side of the bearing. An inner lip 34 is provided for being in contact with a side 23a. The side 23a of the step 23 extends radially along the inner race 21. An outer lip 35 projects outwardly from the bearing and is confronted with a side 24a with a small clearance. The side 24a of the ring 24 extends radially. An intermediate lip 36 radially and inwardly extended is confronted with a cylinder 24b of the ring 24 with a very small clearance.

The operation of the pressure-resistant seal 30 is now described. The axial width of the lip body 33 is set to be smaller than the width of the annular concavity 25. When the pressure in the inside of the bearing is higher than the pressure of the outside of the bearing, the pressure-resistant seal 30 is swung toward the outside of the bearing around the coupling portion at the outer diameter. Hence, the inner lip 34 being in contact with the side 23a of the inner step 23 in the annular concavity 25 is separated to thereby provide a gap, to which the outer lip 35 separated from the side 24a of the ring 24 is strongly pressed. Then, there becomes a gap between the inner lip 34 and the side 23a of the inner step 23, through which a lubricant in the inside of the bearing can pass. A fine seal is formed between the intermediate lip 36 and the cylinder 24b of the ring 24. The outer lip 35 comes in contact with the side 24a of the ring 24. Therefore, a substantially complete seal can be formed between the inside and the outside of the bearing. Then, when the pressure in the outside of the bearing is higher than that in the inside of the bearing, the pressure-resistant seal 30 is swung into the inside of the bearing at this time. The outer lip 35 is separated from the side 24a of the ring 24 to thereby produce a gap. The inner lip 34 is strongly pressed to the side 23a of the inner step 23. Therefore, the outside of the bearing is also substantially sealed from the inside of the bearing in this case.

Thus, in compliance with the changes in pressure of the inside and the outside of the bearing, the pressure-resistant seal 30 is swung, so that either the inner lip 34 or the outer lip 35 serves to seal the inside of the bearing from the outside thereof. While the pressure-resistant 30 is being swung, the intermediate seal 36 serves to seal it. During changes in the pressure, the inside of the bearing can be sealed from the outside thereof.

The reason why the intermediate lip 36 is provided through a small gap from the cylinder 24a of the ring 24 is that friction resistance can be reduced during the swing of the pressure-resistant seal 30 to thereby avoid the increase of starting torque of the engine.

In the pressure-resistant seal 30, the inner flange of the metal core 31 is into to the lip body 33 to strengthen the waist of the lip body 33, so that the inner lip 34 is strongly urged to the side 23a of the inner step 23. Therefore, while the pressures in the inside and the outside of the bearing are sutstantially similar, the inner lip 34 may disadvantageously be worn out and the starting torque may become larger.

Figure 3:
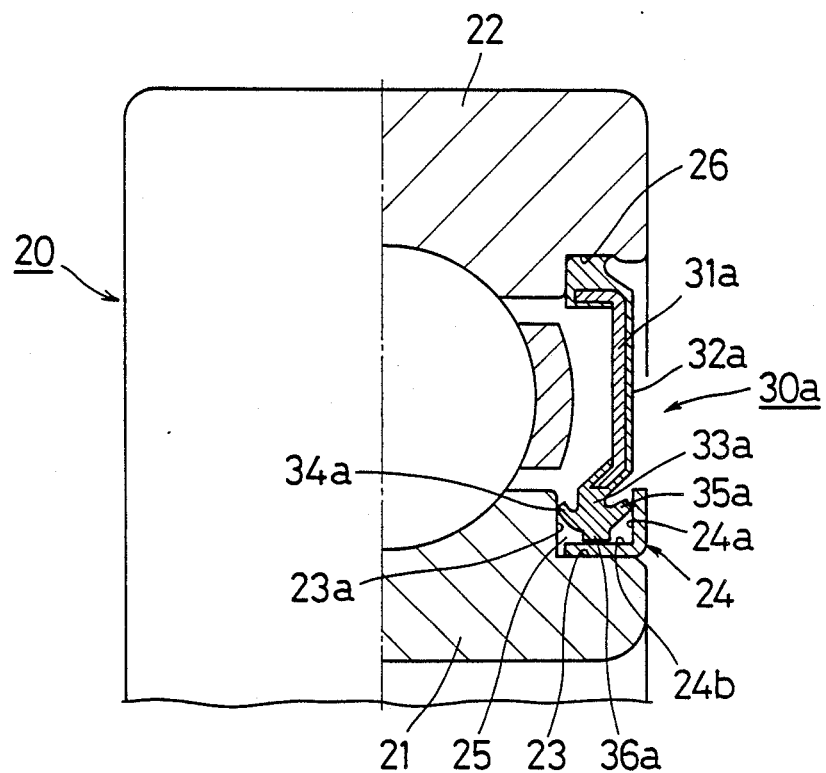
FIG. 3 is a cross-sectional view of another seal bearing.

FIG. 3 shows another preferred embodiment of a pressure-resistant seal to improve the above points. Like elements corresponding to those in FIG. 2 are not described in detail, but the different elements only are described in detail. In a pressure-resistant seal 30a, a metal core 31a is not inserted into a lip body 33a and not positioned within the annular concavity 25, so that the waist of the lip body 33 is somewhat weakened as compared with the case of FIG. 2. Further, an inner lip 34a and an outer lip 35a being positioned in front of the annular concavity 25 formed on the shoulder of the inner race 21 are formed as described below.

The inner lip 34a is somewhat inclined so as to expand to the outer side radially. When the pressure in the outside of the bearing can compete with that in the inside of the bearing, the inner lip 34a can be slightly in contact with the side 23a of the inner step 23. When the pressures in the outside and the inside of the bearing are substantially similar, the outer lip 35a is slightly in contact with the side 24a of the ring 24.

The pressure-resistant seal 30a of FIG. 3 is constructed such that the inner lip 34a and the outer lip 35a are slightly in contact with each other when the pressure in the inside of the bearing can compete with the pressure in the outside of the bearing. Both lips 34 and 35 will wear less than the construction of FIG. 2 and a small starting torque is sufficient to work out.

In the above described pressure-resistant seals 30 and 30a, the outer flange is attached to the circumferential step 26 of the outer race 22 to thereby provide a seal at the side of the inner race 21. Otherwise, the inner flange of the pressure-resistant seal can be attached to the step 23 of the inner race 21 to provide a seal at the side of the outer race 22. The ring 24 provided on the circumferential step 23 of the iner race 21 may be a material with a self-lubricative characteristic or be coated with a film of a solid lubricant, so that each lip can become lubricated during sliding.

As described above, according to the present invention, the following effects can be offered. The bearing for supporting a crankshaft comprises a sealed bearing with a lubricative characteristic, so that no lubricant oil needs to be supplied to the sealed bearing. Therefore, the amount of the lubricant oil contained with mixing combustion gas can be reduced by the amount conventionally otherwise supplied to the bearing. The white smoke in the exhaustion gas after combustion can be restricted. A conduct can be eliminated for supplying the lubricant in the mixing combustion gas to the bearing supporting the crankshaft, thereby simplifying the engine structure.

While only certain embodiments of the present invention have been described, it will be apparent to those skilled in the art that various changes and modifications may be made therein without departing from the spirit and scope of the present invention as claimed.

What is claimed:

1. A crankshaft support comprising:
    a crankshaft for a two-stroke engine;
    crankcase means for supporting said crankshaft therein;
    sealed bearing means having pressure-resistant seal means, said pressure-resistant seal means being positioned radially between outer and inner races of said sealed bearing means, said sealed bearing means being interposed between said crankshaft and said crankcase means,
    said pressure-resistant seal means comprises disk means and lip body means provided at a circumferential portion of said disk means, said lip body means being positioned within an annular concavity formed on a shoulder of one of the outer and inner races, said lip body means comprises:
        outer lip means responsive to pressure from inside the sealed bearing means for being pushed into contact with one side of the annular concavity according to variations of said lip body means;
        iner lip means responsive to pressure from outside the sealed bearing means for being pushed into contact with an opposite side of the annular concavity according to variations of said lip body means; and
        intermediate lip means for moving radially toward a bottom face of the annular concavity closing a gap during the pushing of said lip body means.

2. The crankshaft support as recited in claim 6, wherein the inner race has a circumferential step defining said opposite side thereof, and further comprising a generally L-shaped ring engaged with the circumferential step, the circumferential step and the ring defining the annular cavity.

3. The crankshaft support as recited in claim 2, wherein the inner lip means contacts said opposite side unless pressure inside the sealed bearing means is higher than pressure outside the sealed bearing means, the outer lip means projects toward the ring defining said one side with a slight gap therebetween unless pressure inside the sealed bearing means is higher than pressure outside the sealed bearing means whereupon the outer lip means moves into contact with the one side and the intermediate lip means projects toward a cylinder of the ring, the cylinder engages the bottom face of the annular concavity and the gap being formed between the cylinder and the intermediate lip means, a fine seal being formed between the intermediate lip and the cylinder during movement of said lip body means.

4. The crankshaft support as recited in claim 3, wherein a metal core is provided within said pressure-resistant seal means for strengthening said disk means and said lip body means.

5. The crankshaft support as recited in claim 2, wherein the inner lip means contacts said opposite side at least when pressure inside the sealed bearing means is similar to pressure outside the sealed bearing means, said inner lilp means being angled relative to the opposite and the outer lip means being slightly in contact with the one side at least when pressure inside the sealed bearing means in similar to pressure outside the sealed bearing means.

6. The crankshaft support as recited in claim 5, wherein a metal core is provided in said pressure-resistant seal means for strengthening said disk means, said lip body means being generally free of engagement with the metal core.

* * * * *

UNITED STATES PATENT AND TRADEMARK OFFICE
CERTIFICATE OF CORRECTION

PATENT NO. : 4,969,423
DATED : November 13, 1990
INVENTOR(S) : Kitauchi et al.

It is certified that error appears in the above-identified patent and that said Letters Patent is hereby corrected as shown below:

On the title page, item [73]:
    Please change the name of the Assignee from "Koyo Keiko Co., Ltd." to --Koyo Seiko Co., Ltd.--

Signed and Sealed this

Seventh Day of April, 1992

Attest:

HARRY F. MANBECK, JR.

*Attesting Officer*          *Commissioner of Patents and Trademarks*